May 13, 1969 K. G. TIPPETS 3,443,308

METHOD OF LUBRICATING BLIND HOLES

Filed March 30, 1967

United States Patent Office 3,443,308
Patented May 13, 1969

3,443,308
METHOD OF LUBRICATING
BLIND HOLES
Karl Guymon Tippets, Martinsville, Va., assignor to E. I. du Pont de Nemours and Company, Wilmington, Del., a corporation of Delaware
Filed Mar. 30, 1967, Ser. No. 627,187
Int. Cl. B23p 25/00; C23c 13/00
U.S. Cl. 29—558        2 Claims

ABSTRACT OF THE DISCLOSURE

In preparation for a punching step, the interiors of blind holes are lubricated from a layer of lubricant on the apertured surface of a plate by reducing ambient air pressure and then re-exposing the plate to normal ambient air pressure.

---

This invention relates to a method of forcing a liquid into small holes and, more particularly, to a simplified procedure for lubricating counterbore holes in a spinneret plate before a punching operation.

A known procedure for fabricating precision capillaries in spinneret plates includes successive steps leading to formation of a blind hole and eventually to perforation of the plate by punching into the hole. In the latter step, it is essential that the punch and the hole be lubricated. Since surface tension prevents a lubricant from flowing freely into the small counterbore holes, it has been the practice to place a drop of lubricant in each hole with a wire or needle-tipped tool. This is extremely time-consuming and costly.

According to the present invention, blind holes in a partially fabricated plate are lubricated by applying a layer of lubricant to the plate over the entrances to the holes, subjecting the plate to sub-atmospheric pressure, and then re-exposing the plate to ambient atmospheric pressure.

Figure 2:
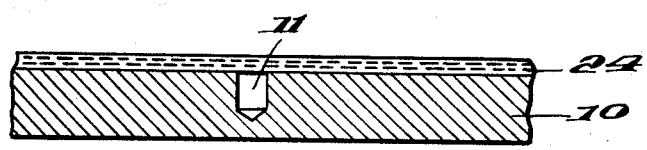
Figure 3:
Figure 4:
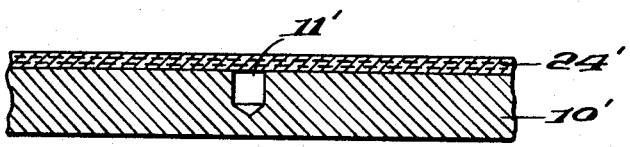

Various objectives and advantages of such a method have been described in the following specification wherein reference is made to the accompanying illustration of preferred and alternative procedures and equipment. In the drawing, FIGURE 1 is a cross-sectional view of equipment used to subject a plate to sub-atmospheric pressure, FIGS. 2, 3 are enlarged fragmentary sectional views of the plate before and after an ambient pressure reversal and FIG. 4 is a similar view of an alternative application technique.

Figure 1:
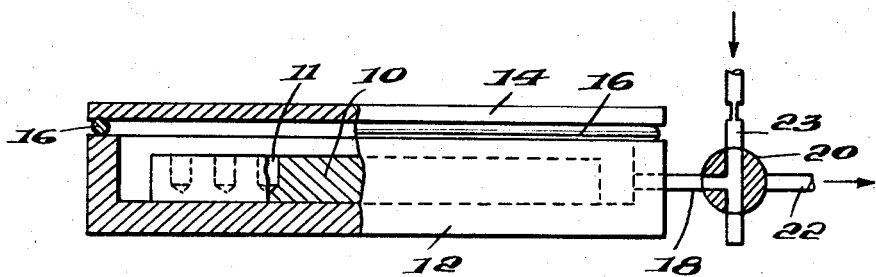

As shown in FIG. 1, a partially fabricated circular spinneret plate 10 with a pattern of counterbores 11 is placed in a housing 12. A lid 14 with a sealing ring 16 is placed on top of housing 12. Conduit 18 is connected, by the position of a three-way valve 20, either to a vacuum supply through conduit 22 or to ambient atmospheric pressure through a restricted conduit 23.

Either before or after its placement in housing 12, a layer of lubricant 24 is brushed on the apertured surface of spinneret plate 10 over counterbores 11. Due to their small size, air is trapped in the counterbores (FIG. 2). With lid 14 and seal 16 in place on housing 12, valve 20 is positioned such that a vacuum is applied through conduits 18, 22. This vacuum or sub-atmospheric pressure pulls air out through the layer of lubricant shown in FIG. 2. After a short time (e.g., 15 seconds), the three-way valve is repositioned to connect conduit 18 to ambient atmospheric pressure through restricted conduit 23 (FIG. 1). The gradual, controlled increase in pressure above the lubricant forces it down into each counterbore 11 in spinneret 10 (FIG. 3). Lid 14 is now removed and the apertured surface of the spinneret plate is wiped in preparation for the subsequent punching operation.

When air is pulled from the capillary, it leaves a hole in the oil film. If it were not for the restriction in conduit 23, air would rush back into the blind hole before reformation of the film.

Instead of brushing oil onto the plate and relying on a restriction in conduit 23, a layer of lubricant can be applied over each hole 11' by soaking a felt 24' with oil and placing it on spinneret plate 10', as shown in FIG. 4. When air is pulled from the holes, the felt prevents formation of any sizeable hole in the oil it contains. When the vacuum is released, oil is forced from the felt into the holes. This alternative is especially advantageous in that the plate is essentially clean after removal of the felt, i.e., there is no need to wipe excess oil from plate 10'.

In the past, it took one or two seconds per hole to hand apply a lubricant. By using the method disclosed herein, all of the previously machined counterbores in a multihole spinneret plate can be properly lubricated in approximately thirty seconds. Thus, when a plate has a large number of holes, there is a considerable saving in labor and time, as well as a more thorough and effective lubrication of each hole.

Although the method has been described in connection with the application of a lubricant to small counterbore holes in a spinneret plate, it can be used to apply any liquid to a series of small holes where surface tension prevents free flow of the liquid into the holes. A simple vacuum gage connected to the housing would permit short cycles by pulling only the required amount of vacuum. Other modifications and adaptations of a similar nature will occur to those skilled in the art without departing from the invention which, accordingly, is intended to be limited only by the scope of the appended claims.

Having thus described the invention, what is claimed as new and desired to be secured by Letters Patent is:

1. A method of lubricating a blind hole in a plate in preparation for a machining step, said method comprising the steps of: applying a layer of lubricant by placing a soaked felt on the plate over said hole; reducing the atmospheric pressure on the plate; and re-exposing the plate to ambient atmospheric pressure.

2. A method of fabricating holes in a plate comprising: machining at least one blind hole in a surface of the plate; applying a layer of lubricant to said surface over the hole; exposing the plate to sub-atmospheric pressure; permitting a gradual re-exposure of the plate to ambient atmospheric pressure, thereby forcing lubricant into the hole; and then further machining the lubricated blind hole.

References Cited

UNITED STATES PATENTS

| 2,148,221 | 2/1939 | Schneider | 72—30 |
|---|---|---|---|
| 2,366,935 | 1/1945 | Schmid. | |
| 2,577,205 | 12/1941 | Meyer et al. | |
| 2,893,793 | 7/1959 | Ryshavy. | |

JOHN F. CAMPBELL, Primary Examiner.

PAUL M. COHEN, Assistant Examiner.

U.S. Cl. X.R.

29—527, 530; 117—119